Feb. 14, 1961 B. GAGE 2,971,611
DISC-TYPE BRAKES
Filed July 28, 1958 2 Sheets-Sheet 1

INVENTOR
Bruce Gage

BY

ATTORNEYS

Feb. 14, 1961   B. GAGE   2,971,611
DISC-TYPE BRAKES
Filed July 28, 1958   2 Sheets-Sheet 2
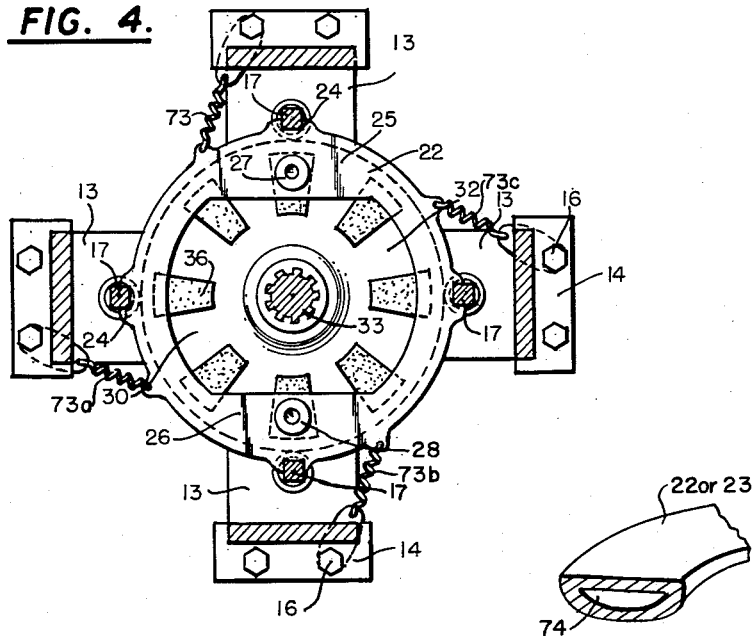
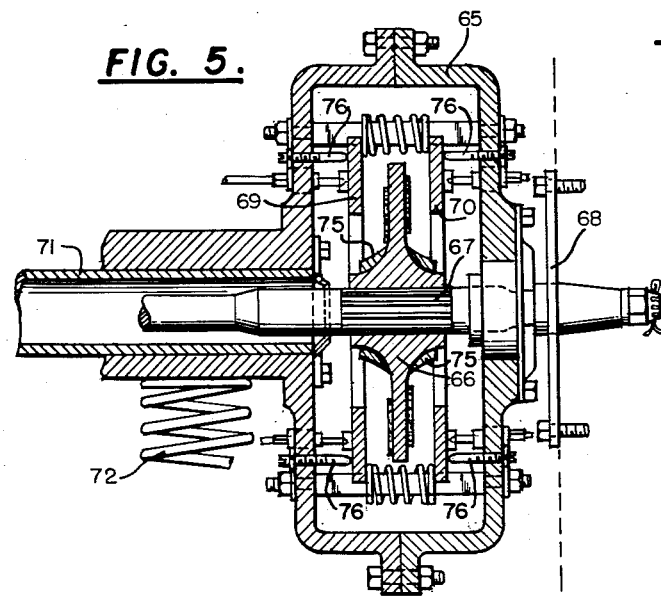
INVENTOR
Bruce Gage
BY
ATTORNEYS United States Patent Office 2,971,611
Patented Feb. 14, 1961

2,971,611
DISC-TYPE BRAKES
Bruce Gage, P.O. Box 10222, San Antonio, Tex.
Filed July 28, 1958, Ser. No. 751,397
11 Claims. (Cl. 188—72)

The present invention relates to braking systems, particularly for automotive vehicles, and is primarily concerned with an improved brake structure of the so-called disc-type which exhibits appreciable advantages in both construction and operation over brakes presently known or suggested heretofore.

Various forms of braking assemblies have been suggested in the past. One such form comprises a brakeband mounted externally with respect to a wheel assembly and adapted to apply frictional forces to a portion of the rotating wheel or its mounting in order to slow or stop said wheel. The exposed construction of such brakebands is often unsatisfactory for a number of reasons, and efforts have been made to eliminate this construction through the use of internal or enclosed braking assemblies. In this regard, therefore, it has been suggested that so-called disc-type brakes might be employed. This particular form of brake, in its basic configuration, comprises an enclosing drum carrying one or more discs or annular friction surfaces, adapted to rotate with a vehicle wheel, on the interior of said drum; and one or more further friction surfaces, comprising for example non-rotating discs, are disposed closely adjacent to the aforementioned rotating discs with said drum. Braking is accomplished through an appropriate mechanical or other control linkage operative to cause the non-rotating friction surfaces to bear upon the aforementioned rotating friction surfaces whenever it is desired to slow or stop said vehicle wheel.

It has been found that such disc-type brakes exhibit a number of highly desirable operational features. In particular, the brakes do not wear readily, stay relatively clean, brake with relatively little noise, and give excellent stopping or braking of the vehicle. It has been further found, however, that disc brakes of forms suggested heretofore tend to generate considerable heat during a braking operation; and this heat, due to the forms of brake linings ordinarily employed, tends to cause the braking operation of the overall assembly to deteriorate and brake slippage to occur. This undesirable operation becomes most readily apparent under conditions wherein successive braking operations must be effected in such close time proximity to one another that the heat generated during each braking step cannot be appreciably dissipated prior to the next braking step; and as a result of this heat accumulation and consequent brake slippage, disc-type brakes have tended to fall into some disfavor and are at the present time used only infrequently.

Various alternative internal brake structures have been suggested, and one typical such structure which is widely used at the present time comprises a pair of shoes disposed within and normally spaced from the inner surface of a drum, and associated with an appropriate operating mechanism such as a hydraulic cylinder adapted to press the shoes outward into contact with the inner drum surface when braking is desired. This form of structure, while providing relatively good braking, has nevertheless been found to generate considerable heat and to be subject to slippage effects of the type described previously; and it has also been found that considerable wear of the brake shoes occurs, as well as somewhat poorer braking than is characteristic of disc-type brakes.

It has, moreover, been found that all of these internal or enclosed brake assemblies, including prior disc-type brakes, are in general so constructed and arranged that dirt and moisture tend to become trapped within the brake housing, thereby detracting from proper braking after extended periods of use; and, moreover, brake assemblies suggested heretofore, as well as those being employed presently, are ordinarily so constructed that maintenance and repair comprise relatively difficult, time-consuming and expensive procedures.

The present invention serves to obviate all of these disadvantages of prior structures, and is concerned with an improved braking assembly which is adapted to incorporate the desirable features of disc-type brakes suggested heretofore without at the same time being subject to the difficulties caused by the heat generation which has been characteristic of prior disc-type brakes. In particular, the present invention is concerned with a brake structure of disc-type which is adapted to run and operate cooler than braking assemblies now employed or suggested heretofore; and which is further so constructed and arranged that it stays cleaner, gives better braking for a longer life, and is adapted for more ready maintenance and brake lining replacement than has been possible in the past.

It is accordingly an object of the present invention to provide improved braking systems, particularly for automotive vehicles.

Another object of the present invention resides in the provision of an improved disc-type brake structure which is adapted to run cooler than braking structures suggested heretofore.

A still further object of the present invention resides in the provision of braking assemblies so constructed and arranged that dirt and other foreign matter cannot be permanently trapped therewithin, whereby the brake surfaces remain cleaner, and give better braking operation for longer periods of time than has been possible in the past.

A still further object of the present invention resides in the provision of an improved brake assembly which includes a braking surface so constructed and arranged as to exhibit a blower effect at times intermediate actual braking operations, thereby to effect rapid cooling and thorough cleaning of the brake assembly interior.

Still another object of the present invention resides in the provision of an improved brake assembly having an open type housing in combination with structures disposed within said housing adapted to effect a circulation of air through the housing and past the braking surfaces.

Still another object of the present invention resides in the provision of an improved brake assembly so constructed and arranged that less maintenance is required and simpler and less expensive procedures can be utilized to replace the brake linings than has been possible heretofore.

In providing for the foregoing obejects and advantages, the present invention contemplates the provision of a disc-type brake comprising an open type housing having a pair of spaced pressure plates attached thereto. These plates are supported by means adapted to prevent rotation of said plates, but also adapted to permit axial movement of said plates toward and away from one another under the control of appropriate operator means such as hydraulic cylinders. A further braking surface, rotatable with a wheel and/or shaft being braked, is disposed between the aforementioned non-rotatable pressure plates. The rotatable disc comprises, as will be described, an annular surface having a plurality of blocks or limited braking surfaces bonded and/or riveted thereto in spaced disposition to one another; and the brake lining so formed by these blocks or limited surfaces takes the form of a plurality of "patches" radially distributed in spaced relation to one another about both sides of the rotating brake disc, with the patches on one side of the disc being interspersed by patches on the other side of the disc.

The overall assembly therefore comprises a structure which includes moving or movable patches of frictional material disposed adjacent to but normally spaced from each of the aforementioned non-rotatable pressure plates, whereby braking can be effected by causing the non-rotatable pressure plates to move axially into frictional contact with the rotatable disc carrying said patches of frictional material. The construction of said rotatable disc assumes a blower configuration whereby, in the absence of braking operations, an appreciable circulation of air is effected within and through the aforementioned open housing. This circulation of air causes the brake to run much cooler than has been possible heretofore, and results in an extremely rapid dissipation of any heat which might be generated during any one or successive braking operations. Moreover, the overall assembly causes any dirt or moisture, which tends to accumulate within the brake housing, to be expelled from the housing due to combined actions of centrifugal force and blower effect during normal operation of the brake assembly, whereby said assembly stays appreciably cleaner than has been possible heretofore.

As will appear subsequently, the overall structure is so assembled that it may be readily serviced and maintained; and in addition, disassembly is much simpler than has been possible with brake structures suggested heretofore, whereby the brake linings may be replaced in less time and at less expense than has been the case in the past.

The foregoing objects, advantages, construction and operation of the present invention will become more readily apparent from the following description and accompanying drawings, in which:

Figure 4 is a view taken on line 4—4 of Figure 2.

Figure 5 is a cross-sectional view of a braking assembly constructed in accordance with the present invention and adapted for use on the rear wheels of an automotive vehicle; and Figure 6 illustrates a modified form of pressure plate which may be employed in the present invention.

Figure 1:
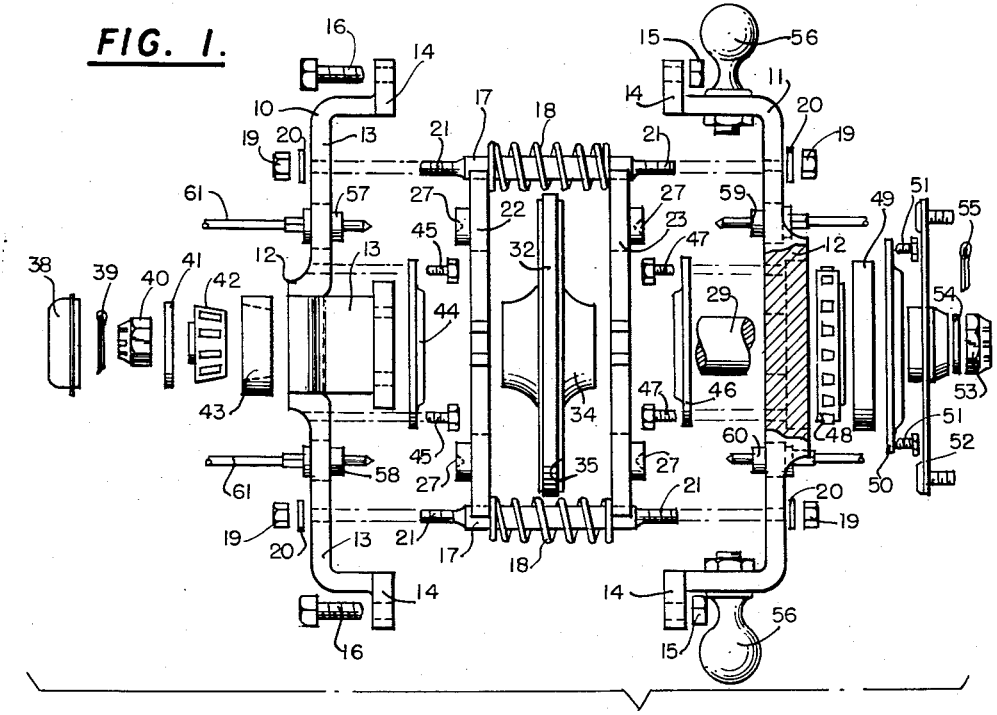
Figure 1 is an exploded representation of a front wheel braking assembly constructed in accordance with the present invention.

Referring now to Figure 1 it will be seen that, in accordance with the present invention, an improved disc-type brake may comprise a pair of housing or frame members 10 and 11, each of which is of "open type" construction. In particular, each frame or housing member 10 and 11 includes a central supporting portion 12, and four equidistantly spaced arms 13 extending therefrom (see especially Figure 4). For purposes of clarity, only two of said arms have been shown on framed portion 11 in Figure 1. The several arms 13 include outer flange portions 14 which are adapted to mate with one another, whereby the frame portions 10—11 may be removably fastened to one another, e.g. by nut and bolt members 15—16 to form an assembled open frame of the type particularly shown in Figure 2. The flanges 14, actually shown in the drawings, extend outwardly with respect to frame 10—11. If desired, the flanges may extend in other directions, particularly to the sides of the outermost end of each arm 13, in order to increase the room available for attaching a steering mechanism to knuckles 56 (to be described).

The frame 10—11 is adapted to support four rod members 17, each of which carries a helical spring 18; and as will be seen from Figure 4, the rod members 17 are preferably of rectangular cross-section, are preferably equidistantly spaced from one another, and are adapted to be bolted to the individual frame arms 13 by means such as nuts and washers 19 and 20 which thread-engage outer threaded portions 21 on each of the rods 17. The rods 17 are in turn adapted to slidably support a pair of braking pressure plates 22 and 23. As will be seen from Figure 4, each of the plates 22 and 23, which are identical in configuration, includes four rectangular recesses 24 adjacent the outer periphery thereof adapted to slide upon rods 17; and each of the plates 22 and 23 is of generally annular configuration and includes upper and lower arcuate portions 25 and 26 carrying a pair of recessed centering elements 27 and 28 respectively, which are adapted to receive the pistons of hydraulic cylinders 57—60 (to be described). If desired, tensioning springs 73 (see Figure 4) may be disposed between frame arms 13 and the outer surfaces of plates 22 and 23 to inhibit rattling or play of plates 22 and 23 on the rods 17. Only one such spring has been shown in Figure 4, but the positions of three other such springs are indicated by dashed lines labeled 73a, 73b and 73c; and such springs are preferably provided for both of plates 22 and 23.

Figure 2:
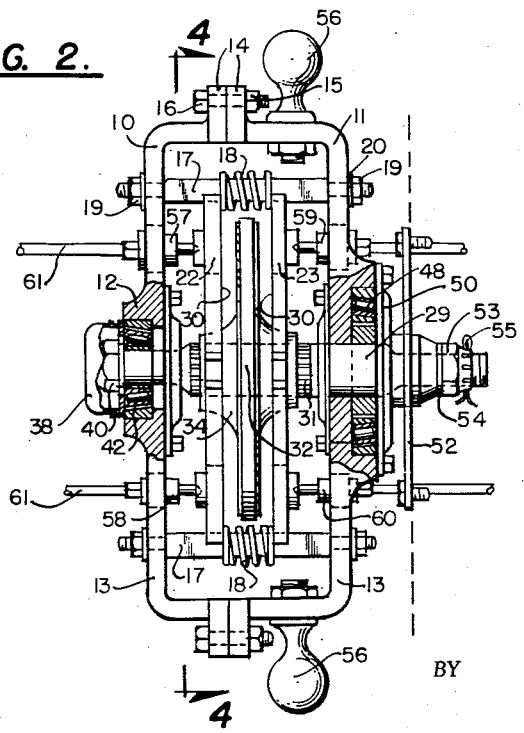
Figure 2 is an assembled cross-sectional view of the arrangement shown in Figure 1.

As will be noted from the arrangements shown in Figures 1 and 2, the two braking pressure plates 22 and 23, which are preferably formed of a smooth non-warping high grade material such as cast iron or steel, are slidably disposed on the rods 17, with the springs 18 being interposed between said plates 22 and 23. By this arrangement, therefore, the plates 22 and 23 are disposed within the housing 10—11 in such manner that they may be moved toward one another in an axial direction. The springs 18 assure that the plates 22 and 23 are normally disposed at positions remote from one another, while the rods 17, mounted on frame 10—11, assure that the plates 22 and 23 cannot rotate during or between braking operations. As will become apparent from the subsequent discussion, any heat generated during the braking operation, will tend to heat pressure plates 22 and 23. If desired, these plates 22 and 23 may be constructed so as to be hollow in nature (see Figure 6), with the interior hollow or core 74 of said plates containing a refrigerant, or the like, adapted to prevent excessive heating of plates 22 and 23.

An elongated shaft 29 (only a short piece of which is shown in Figure 1 for purposes of clarity) extends through the housing 10—11 via the supporting portions 12 of each housing member, and also via the enlarged central opening 30 (see Figures 2 and 4) provided in the annular pressure plates 22 and 23. The shaft 29 (which is best illustrated in Figure 2) is splined in its central portion 31; and this splined portion of shaft 29 is in turn adapted to fixedly hold and support a central braking disc 32 having an internally splined bore 33 (see Figures 2, 3 and 4). Braking disc 32 includes a central hub 34, and also includes an annular periphery 35 integrally formed with hub 34 and adapted to carry a plurality of brake lining patches 36 on each side thereof.

Figure 3:
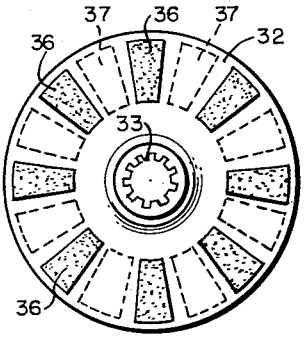
Figure 3 is a front view of the rotatable brake disc employed in the assemblies of Figures 1 and 2.

As is best seen in Figure 3, the lining patches 36, which may be formed of any conventional brake lining material, are disposed in spaced relation to one another on one side of the annulus 35, with further brake lining portions 37 being interleaved in position with portions 36 and disposed on the opposite side of annulus 35. By reason of this configuration, therefore, each side of annulus 35 includes a plurality of spaced friction producing surfaces radially disposed about shaft 29, with the friction producing surfaces on the two sides of the annulus 35 being interleaved with one another. It will be noted that this arrangement causes the central braking disc 32 to assume a blower type configuration; and rotation of shaft 29, with resultant rotation of central braking disc 32, will cause an appreciable movement of air within and through the open type housing 10—11. This blower effect may be augmented, if desired, in the arrangement of Figures 1–4 by providing vanes or the like adjacent the periphery of annulus 35 and/or adjacent the external surface of central hub 34; and such vanes, as located near the central hub, have been shown at 75 in the embodiment of Figure 5.

Shaft 29 is rotatably supported on housing portion 10 by means which includes, at one end of said shaft, a grease retaining hub cap 38, cotterpin 39, spindle nut 40, space washer 41, a roller bearing 42 having outer race 43, and an inner grease seal 44 attachable to housing portion 10 by bolts 45. The other end of shaft 29 is rotatably supported on frame portion 11 by an assembly which includes an inner grease seal 46 mounted in place by assembly bolts 47, wheel bearing 48 having an outer race 49, and an outer grease seal 50 which is attachable to the outer portion of frame portion 11 by assembly bolts 51.

The opposed ends of the shaft 29 which pass through the frame portions 10 and 11 are threaded, and the lefthand threaded end (as viewed in Figures 1 and 2) is engaged by spindle nut 40. The righthand end of shaft 29 (as viewed in Figures 1 and 2) has a wheel hub 52 splined or keyed thereto; and said hub is retained in place by an assembly which includes a retaining nut 53, space washer 54 and cotterpin 55. It will be appreciated, of course, that when employed as a braking unit for an automotive vehicle, the assembly as viewed in Figures 1 and 2 is adapted to receive a wheel on the righthand portion of the overall assembly, i.e. bolted to wheel hub 52; and it will be noted, in addition, that frame portion 11 includes ball joint steering knuckles 56 which may be attached to an automotive steering mechanism in conventional manner.

The frame members 10 and 11 include and support, as mentioned previously, four hydraulic cylinders 57 through 60 inclusive, which include, as illustrated, projecting piston rods adapted to seat within the recessed centering portions 27 on the outer surfaces of braking pressure plates 22 and 23. Each frame portion 10 and 11 includes a pair of said cylinders, 57—58 and 59—60, respectively; and these pairs may be disposed in opposed horizontal or vertical arms 13, as may be desired. The spring members 18 normally hold the pressure plates 22 and 23 in such position that they are seated upon the piston rods of hydraulic cylinders 57 through 60; and fluid pressure may be applied to the several hydraulic cylinders 57 through 60 by means such as fluid lines 61, whenever it is desired to effect a braking operation. As a practical matter, the pressure plates 22 and 23 should be disposed closely adjacent the opposed sides of disc 32, preferably with a spacing of only about 0.005 to 0.010 inch between each plate and said disc; and this assures that cylinders 57—60 need move the pressure plates only a small distance when braking is desired. Adjustment screws (not shown) may be disposed in the several arms 13 bearing upon the outer faces of plates 22 and 23 to position and align plates 22 and 23 relative to the facing surfaces of disc 32; and such adjustment screws as may be employed in the arrangement of Figures 1–4, have been shown at 76 in Figure 5. It will be understood that an adjustment screw 76 is preferably provided through each of the several arms 13 whereby there are four such screws for adjusting each of plates 22 and 23; and each such screw 76 preferably includes a lock nut and washer to prevent slippage thereof between adjustments.

The several parts thus described in reference to Figure 1 are shown in assembled configuration in Figure 2. It will be noted that, as assembled, the overall arrangement comprises a stationary frame 10—11 of open type configuration adapted to permit substantial circulation of air therethrough. This overall frame is non-rotatably attached to the vehicle chassis in conventional manner, and carries on its outer side (the righthand side as viewed in Figure 2) a wheel hub for supporting a rotating wheel, comprising in this instance the front wheel of an automotive vehicle. This wheel, during its rotation, effects rotation of the shaft 29 which in turn produces rotation of the central braking disc 32 carrying alternately disposed lining patches 36—37 thereon, and accordingly, due to the blower configuration of the central braking disc 32, a considerable circulation of air is produced in and through the housing 10—11.

The pair of outer braking pressure plates 22 and 23 are supported within the open housing 10—11 in such manner that they may be axially moved toward one another and toward the opposed frictional surfaces of central braking disc 32; but these outer braking plates 22 and 23 are normally maintained in spaced apart relation to one another by the spring members 18. Upon application of fluid pressure to the lines 61, the hydraulic cylinders 57 through 60 inclusive apply forces to the outer pressure plates 22 and 23 which cause these plates to move against the restraint of springs 18 into frictional contact with the periphery of rotating braking disc 32; and the frictional forces thus produced between disc 32 and each of plates 22 and 23 inhibit rotation of shaft 29 and of the wheel attached to hub 52, thereby to effect braking of said wheel. Any heat which is generated during such a braking operation tends to dissipate rapidly due to the fact that the housing 10—11 is open to air, and due further to the fact that as soon as a given braking operation ceases and the wheel starts rotating again, the central disc 32 produces a forced circulation of air through the housing and past the surfaces of members 22, 23 and 32.

It should further be noted that by reason of the open type construction for frame or housing 10—11, dirt and moisture cannot be permanently trapped within the overall brake assembly; and as soon as disc 32 rotates, due to rotation of a wheel attached to hub 52, the forced air circulation through housing 10—11 causes any moisture within the housing to be quickly dried, and further causes any dirt or foreign matter to be forcibly expelled from the housing. The braking surfaces 36—37 carried by the peripheral portion of central braking disc 32, may be attached to the disc 32 by bonding and/or riveting; and it will be noted that the overall construction of the assembly is such that it may be readily disassembled and the braking surfaces may be readily replaced with a minimum of effort and expense, and in a fairly short time.

As mentioned previously, the central braking disc 32 is held and carried on shaft or spindle 29 by splines formed on members 29 and 32; and these splines should be machined with some exactness to assure that the disc 32 will not become loose and will not slip or rattle during continued operation of the assembly. It should further be noted that the bearing members 42 and 48 are of conical bearing type; and the opposing thrust of these two bearings tends to keep the disc 32 in dead center, thereby assuring efficient braking even under conditions of long use. The overall assembly shown in Figures 1 and 2 may be mounted or attached to a rigid front axle by means of a large fork disposed at each end of said axle; or specially curved and shaped independent suspension bars may be used, as desired.

The assembly thus far described relates to front wheel braking, of course; but it will be appreciated that substantially the same construction may be employed for rear wheel (or non-steerable wheel) braking applications. Such a structure is shown in Figure 5. In general, such a rear wheel braking assembly will again comprise an open type frame 65 constructed as a pair of separable parts in the manner already described, with this open type frame assembly again rotatably supporting a central braking disc 66 splined to a rotating shaft 67 (analogous to shaft 29) adapted to carry on its outer end a hub 68 for supporting a rear wheel. The frame 65 further includes a pair of non-rotatable, axially slidable pressure plates 69 and 70 cooperating with hydraulic cylinders in the manner already described.

In order to assure that the housing 65 does not rotate, said housing may be welded or riveted to torque tube 71 which is in turn attached to the differential housing on the automotive vehicle; and a conventional suspension spring arrangement 72 may be disposed, as shown. It will be noted from the illustration in Figure 5 that the other constituent elements of the overall assembly, such as have been described in reference to Figures 1 and 2, may also be included to assure proper suspension, mounting, and operation of the overall assembly.

While I have thus described a preferred embodiment of the present invention, many variations will be suggested to those skilled in the art. By way of example, the brakes of the present invention, while described in reference to automotive applications, may be employed in more general applications when desired. Variations in the arrangement and construction of the individual parts comprising my assembly will also be apparent. It must therefore be emphasized that the foregoing description is meant to be illustrative only and is not limitative of my invention. All such modifications and variations as are in accord with the principles described are meant to fall within the scope of the appended claims.

Having thus described my invention, I claim:

1. In a braking assembly, a pair of annular braking surfaces disposed in spaced substantially parallel planar relation to one another, supporting means for preventing rotation of said surfaces, said supporting means slidably engaging said pair of surfaces thereby to permit both said surfaces to be moved toward and away from one another, a rotatable shaft extending transverse to said pair of annular braking surfaces, said shaft including a braking disc fixedly attached thereto and rotatable therewith at a position between said pair of braking surfaces, said disc extending in substantially parallel planar relation to said pair of annular braking surfaces and being attached to said shaft by means inhibiting axial movement of said braking disc relative to said shaft, means on said disc adapted to effect a forced circulation of air past said pair of braking surfaces during rotation of said shaft and braking disc, said means for effecting said forced circulation of air comprising a plurality of independent projecting surfaces of frictional material disposed in substantially circumferentially spaced relation to one another on both sides of said disc, the projecting frictional surfaces on one side of said disc being interleaved in position with the frictional surfaces on the other side of said disc, and control means for simultaneously moving both of said pair of annular braking surfaces toward one another into frictional contact with the opposed sides of said fixedly attached braking disc thereby to inhibit rotation of said braking disc and shaft.

2. The combination of claim 1 including a frame for housing and supporting said assembly, said frame comprising a plurality of relatively widely spaced legs defining enlarged apertures therebetween whereby said forced circulation of air occurs both within and through said frame.

3. The combination of claim 1 wherein each of said annular braking surfaces includes a hollow interior portion having a coolant therein.

4. In a braking assembly, a pair of annular braking surfaces disposed in spaced substantially parallel planar relation to one another, supporting means for preventing rotation of said surfaces, said supporting means slidably engaging said pair of surfaces thereby to permit both said surfaces to be moved toward and away from one another, said supporting means including a plurality of rods extending in spaced substantially parallel relation to one another, said rods slidably engaging complementary recesses formed adjacent the peripheries of said pair of annular braking surfaces, first resilient means disposed between said pair of braking surfaces for normally holding said pair of surfaces in spaced relation to one another at positions remote from the opposed sides of said braking disc, and second resilient means for applying a rotational torque to said pair of braking surfaces whereby said rods and complementary recesses are held in resilient engagement with one another thereby to inhibit play of said pair of braking surfaces, a rotatable shaft extending transverse to said pair of annular braking surfaces, said shaft including a braking disc fixedly attached thereto and rotatable therewith at a position between said pair of braking surfaces, said disc extending in substantially parallel planar relation to said pair of annular braking surfaces and being attached to said shaft by means inhibiting axial movement of said braking disc relative to said shaft, means on said disc adapted to effect a forced circulation of air past said pair of braking surfaces during rotation of said shaft and braking disc, and control means for simultaneously moving both of said pair of annular braking surfaces toward one another into frictional contact with the opposed sides of said fixedly attached braking disc thereby to inhibit rotation of said braking disc and shaft.

5. In a braking assembly, a substantially stationary open-type frame structure having a shaft extending therethrough and mounted for rotation therein, one end of said shaft extending external to said open-type frame and including means adapted to support a wheel to be braked, first braking surface means non-rotatably supported within said frame adjacent said shaft, spring means extending between said first braking surface means and said frame for inhibiting play of said first braking surface means relative to said frame, second braking surface means fixedly attached to said shaft for rotation therewith, said second braking surface means being attached to said shaft by means preventing axial shifting of said second braking surface means relative to said shaft, said second braking surface means being of annular disc configuration and including a plurality of projecting frictional surfaces disposed in substantially circumferentially spaced relation to one another adjacent the periphery of said second means and adapted to effect a circulation of air within and through said frame during rotation of said second braking surface means, and means for effecting relative motion between said first and second braking surface means in a direction parallel to said shaft thereby to bring said first braking surface means into frictional contact with the projecting frictional surfaces of said second braking surface means to inhibit rotation of said shaft.

6. In a braking assembly, a substantially stationary housing having a shaft extending therethrough and mounted for rotation therein, one end of said shaft extending external to said housing and including means adapted to support a wheel to be braked, first braking surface means non-rotatably supported within said housing adjacent said shaft, second braking surface means attached to said shaft for rotation therewith, said second braking surface means being of annular disc configuration and including a plurality of projecting frictional surfaces disposed in spaced relation to one another adjacent the periphery of said second means and adapted to effect a circulation of air within said housing during rotation of said second braking surface means, said housing comprising a pair of separable parts each of which parts includes a plurality of elongated projecting legs separably attached to a complementary plurality of said legs on the other of said parts, the portions of said housing between said legs being open to permit circulation of air through said housing, and means for effecting relative motion between said first and second braking surface means in a direction parallel to said shaft thereby to bring said first braking surface means into frictional contact with the projecting frictional surfaces of said second braking surface means to inhibit rotation of said shaft.

7. The combination of claim 6 including adjustment screw means between said projecting legs and said first braking surface means.

8. The combination of claim 6 wherein said means for effecting relative motion comprises hydraulic cylinder means supported by said housing adjacent said plurality of legs and including movable piston means engaging said first braking surface means.

9. A braking assembly comprising an open-type frame adapted to permit free circulation of air therethrough and having a shaft rotatably mounted therein, a disc fixedly and non-slidably attached to said shaft within said frame for rotation with said shaft, said disc including a plurality of spaced frictional surfaces of substantially identical shape circumferentially spaced from one another and disposed about said shaft adjacent the periphery of said disc on both sides of said disc, adjacent frictional surfaces on a given side of said disc being spaced from one another, in a direction coaxial with said shaft, by a distance at least equal to the maximum dimension of said surfaces in said direction coaxial with said shaft, the frictional surfaces on one side of said disc being positioned opposite spaces between frictional surfaces on the opposite side of said disc, said surfaces being adapted to effect a circulation of air within and through said frame and past said disc during rotation of said shaft and disc, means non-rotatably supported by said frame for frictionally engaging said spaced surfaces on both sides of said disc when it is desired to inhibit rotation of said shaft, and control mean for moving said non-rotatably supported means into frictional engagement with said surfaces on both sides of said disc simultaneously.

10. In a braking system, a frame having large openings in the walls thereof adapted to permit free circulation of air therethrough, a rotatable shaft in said frame, a first friction producing surface non-rotatably mounted within said frame, a disc carried by said shaft and rotatable therewith in non-slidable relation thereto, means for effecting relative motion between said surface and disc to effect engagement of said surface and disc when rotation of said shaft is to be inhibited, and a plurality of projections spaced from one another in a circular locus about a limited portion of said disc for effecting a forced circulation of air within and through said frame when said shaft and disc rotate, said circularly disposed projections being located on both sides of said disc with each projection on one side of said disc being disposed opposite a space defined between adjacent projections on the other side of said disc in non-overlapping relation to said adjacent projections on said other side of said disc.

11. A braking assembly comprising a rotatable shaft to be braked, a disc fixedly and non-slidably attached to said shaft for rotation therewith, each side of said disc including a plurality of independent projecting surfaces spaced from one another about said shaft, the projecting surfaces on one side of said disc being interleaved in position with the projecting surfaces on the other side of said disc, said projecting surfaces being adapted to effect a forced circulation of air during rotation of said shaft and disc, a non-rotatable friction producing surface adapted to frictionally engage said spaced projecting surfaces on at least one side of said disc, and means for moving said non-rotatable surface into frictional engagement with said disc thereby to inhibit rotation of said shaft.

References Cited in the file of this patent

UNITED STATES PATENTS

| | | |
|---|---|---|
| 670,948 | Carlson | Apr. 2, 1901 |
| 1,982,235 | Shepherd | Nov. 27, 1934 |
| 2,105,867 | Stewart | Jan. 18, 1938 |
| 2,289,094 | Black et al. | July 7, 1942 |
| 2,326,961 | McCune | Aug. 17, 1943 |
| 2,466,990 | Johnson et al. | Apr. 12, 1949 |
| 2,516,966 | Du Bois | Aug. 1, 9150 |
| 2,778,451 | Friedman | Jan. 22, 1957 |

FOREIGN PATENTS

| | | |
|---|---|---|
| 1,073,362 | France | Mar. 24, 1954 |
| 754,529 | Great Britain | Aug. 8, 1956 |